(12) United States Patent
Smola et al.

(10) Patent No.: US 9,652,010 B2
(45) Date of Patent: May 16, 2017

(54) SYSTEM AND METHOD FOR SEQUENTIAL APPLICATION OF POWER TO ELECTRICAL LOADS

(75) Inventors: Paul Smola, Bedford, NH (US); Bruce Daryl Duhamel, Weare, NH (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 413 days.

(21) Appl. No.: 13/700,564

(22) PCT Filed: May 12, 2011

(86) PCT No.: PCT/IB2011/052099
§ 371 (c)(1),
(2), (4) Date: Nov. 28, 2012

(87) PCT Pub. No.: WO2011/151750
PCT Pub. Date: Dec. 8, 2011

(65) Prior Publication Data
US 2013/0079942 A1    Mar. 28, 2013

Related U.S. Application Data

(60) Provisional application No. 61/350,189, filed on Jun. 1, 2010.

(51) Int. Cl.
*G06F 1/30* (2006.01)
*H02J 3/14* (2006.01)

(52) U.S. Cl.
CPC .................. *G06F 1/30* (2013.01); *H02J 3/14* (2013.01); *Y02B 70/3225* (2013.01); *Y04S 20/222* (2013.01)

(58) Field of Classification Search
CPC .. G06F 1/30; H02J 3/14; Y04S 20/222; Y02B 70/3225
(Continued)

(56) References Cited

U.S. PATENT DOCUMENTS 4,686,630 A    8/1987    Marsland et al.
5,696,695 A    12/1997   Ehlers et al.
(Continued)

FOREIGN PATENT DOCUMENTS

JP    60-081622 A    9/1985
JP    2006345608 A    12/2006
(Continued)

*Primary Examiner* — Kenneth M Lo
*Assistant Examiner* — Derrick Boateng

(57) ABSTRACT

An energy management system for providing sequential application of power to electrical loads contains a series of electrical loads and at least one unit controller, wherein each unit controller connects to at least one electrical load and controls power application to the at least one electrical load. Each individual unit controller has a unique identification to allow for communication with the individual unit controller, wherein each unique identification has a unique power-on delay. The unit controller contains a memory and a processor configured by the memory to: determine if a power-off condition has occurred, being followed by a power-on condition, referred to as a powerup event; and enable delivery of power, after a powerup event, to the at least one electrical load in accordance with the unique power-on delay of the unit controller. A building controller or central server may instead provide sequential application of power.

11 Claims, 5 Drawing Sheets

(58) Field of Classification Search
USPC .......................... 700/292, 297, 295, 298, 291
See application file for complete search history.

(56) References Cited

U.S. PATENT DOCUMENTS

| | | | |
|---|---|---|---|
| 2005/0216131 A1* | 9/2005 | Sodemann et al. ............ | 700/295 |
| 2006/0052906 A1 | 3/2006 | Kates | |
| 2007/0240663 A1* | 10/2007 | Hiramatsu ............. | F02D 41/221 123/179.6 |
| 2008/0067871 A1* | 3/2008 | Black ..................... | H05B 37/02 307/41 |
| 2008/0294291 A1* | 11/2008 | Salsbury ........................ | 700/277 |
| 2009/0307476 A1* | 12/2009 | Khatri ................... | G06F 9/4401 713/2 |
| 2010/0102631 A1* | 4/2010 | Chiou ..................... | G06F 1/266 307/39 |
| 2014/0022685 A1* | 1/2014 | Miao ..................... | H02H 9/001 361/94 |

FOREIGN PATENT DOCUMENTS

| | | |
|---|---|---|
| JP | 2008154068 A | 7/2008 |
| WO | 2008033526 A2 | 3/2008 |

* cited by examiner

SYSTEM AND METHOD FOR SEQUENTIAL APPLICATION OF POWER TO ELECTRICAL LOADS

TECHNICAL FIELD

The present invention is generally related to electrical power distribution, and more particularly is related to sequential application of electrical power to a plurality of electrical loads.

BACKGROUND

When initially supplying electric power to electrical loads or when restoring electric power after an electrical outage, electric power is typically applied to all electrical loads at more or less the same time. For example, when restoring electric power to a building after electric power has been lost, all building equipment and utilities that use electric power typically come back online at the same time. Unfortunately, having everything come back online at the same time may result in power surges, the effect of which may be the blowing of power grids and/or fuses associated with the building power supply. There is therefore a need for a way to prevent electric power from being applied to all electrical loads at the same time in such situations.

Furthermore, while it may be possible to employ a central control system to apply electric power is sequential or nonsimultaneous fashion to a plurality of electrical loads at such times, using such a central control system to accomplish this is likely to be complicated and expensive.

Furthermore, such a central control system may be ineffective when there are a plurality of electrical loads on the same electric circuit. That is, whereas a central control system may be able to cause power to be applied in sequential fashion to each of a plurality of circuits, it is less likely to be able to cause power to be applied in sequential fashion to each of a plurality of electrical loads on any one electric circuit.

It is therefore desirable in such situations that there be a way to apply power in sequential fashion to each of a plurality of electrical loads, and to even apply power in sequential fashion to each of a plurality of electrical loads whether those electrical loads are on the same or different circuits. It is therefore also desirable in such situations that there be a way to apply power in sequential fashion to each of such a plurality of electrical loads so that electric power is applied to each electrical load at a unique time without the need to rely on a central control system.

Thus, a heretofore unaddressed need exists in the industry to address the aforementioned deficiencies and inadequacies.

SUMMARY

Embodiments of the present invention provide an energy management system and method for providing sequential application of power to electrical loads. Briefly described, in architecture, one embodiment of the system, among others, can be implemented as follows. The system contains a series of electrical loads and at least one unit controller, wherein each unit controller is connected to at least one electrical load and controls power application to the at least one electrical load. Each individual unit controller is provided with a unique identification to allow for communication with the individual unit controller, wherein each unique identification is associated with a unique power-on delay. The unit controller further comprises a memory and a processor configured by the memory to perform the steps of: determining if a power-off condition has occurred, being followed by a power-on condition, the sequence of these conditions being referred to as a powerup event; and enabling delivery of power, after a powerup event, to the at least one electrical load in accordance with the unique power-on delay of the unit controller.

In accordance with alternative embodiments of the invention, instead of having functionality for sequentially providing power to electrical loads after a powerup event stored within the unit controller, such functionality may instead by provided by a building controller connected to one or more unit controller, or by a central server connected to one or more building controller.

As used herein, the term "sequential" is used to mean any non-simultaneous application of electrical power to multiple electrical loads. For the purposes of a present disclosure, the term "simultaneous" is defined as being close enough in time to cause electrical overload. It should be noted that the term "sequential" as used herein may in some cases refer to application of electrical power in a fixed or predetermined sequence to multiple electrical loads, but in other cases it may not. Furthermore, it should be noted that the term "sequential" should not be understood to mean that all electrical loads are sequenced, as it is in general possible to bring multiple electrical loads up together without causing an overload, and in some embodiments multiple loads may be brought up together where this would not present a problem.

Generally, in one aspect, the present invention focuses on a system and method for sequential application of electric power to a plurality of electrical loads. In another aspect, the present invention relates to a controller capable of application of electric power to an electrical load at a time corresponding to the value of a unique network address or other such identifier associated with the controller or the electrical load.

Note that where the description below refers to a system for sequential application of power to a plurality of electrical loads in accordance with one aspect of the present invention, this description should be understood to apply as well to a controller and to a method for sequential application of power to a plurality of electrical loads in accordance with other aspects of the present invention with modification as appropriate. The present system may be provided by a Web-based application. While the following description assumes that the present system is provided by a Web-based application, it should be noted that the system may also be provided in an environment that is not Web-based.

The sequential power application system of the invention can be implemented in software (e.g., firmware), hardware, or a combination thereof. In the currently contemplated best mode, the sequential power application system is implemented in software, as an executable program, and is executed by a special or general purpose digital computer, such as a personal computer (PC; IBM-compatible, Apple-compatible, or otherwise), workstation, minicomputer, or mainframe computer. Specifically, the sequential power application system, as provided by the computer, may be accessible via a Web site, through which parties using the sequential power application system may interact. Further description of the sequential power application system, and interaction therewith is provided below.

An example of a general purpose computer that can implement the sequential power application system of the present invention is shown in FIG. 1. In FIG. 1, the sequential power application system is denoted by reference numeral 10. It should be noted that communication with the sequential power application system may be provided by multiple means such as, but not limited to, the Internet. Further description with regard to use of the sequential power application system via use of the Internet is provided below.

Other systems, features, and advantages of the present invention will be or become apparent to one with skill in the art upon examination of the following drawings and detailed description. It is intended that all such additional systems, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. Furthermore, note that where circuit symbols are employed in the drawings, these are used only for illustrative effect and should not be understood to limit the invention to any particular circuit configuration.

In the drawings, like reference characters generally refer to the same parts throughout the different views. Also, the drawings are not necessarily to scale, emphasis instead generally being placed upon illustrating the principles of the invention.

Figure 1:
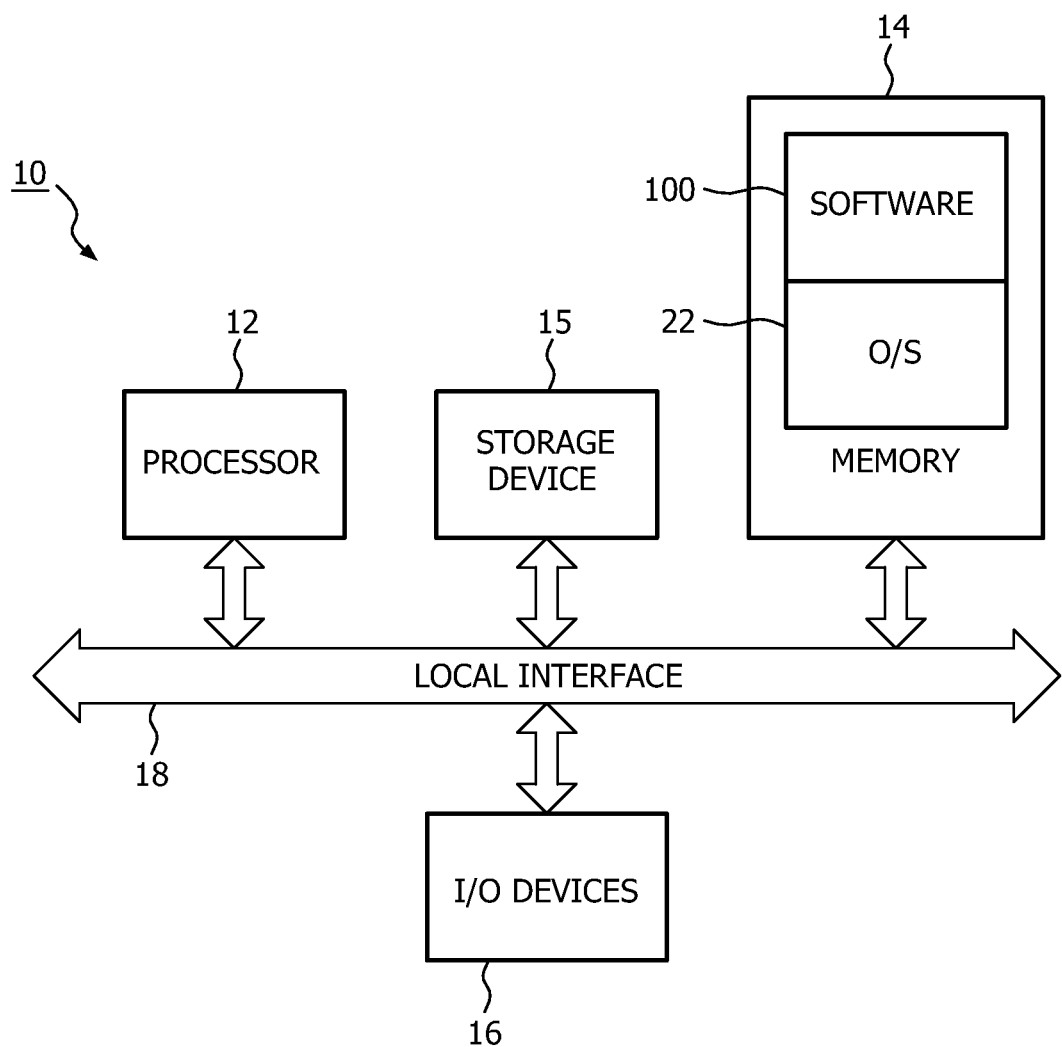
FIG. 1 is a schematic diagram showing an example of a general purpose computer and associated software for implementing a system and method for sequential application of power to a plurality of electrical loads in accordance with one aspect of the present invention.

Generally, in terms of hardware architecture, as shown in FIG. 1, the computer 10 includes a processor 12, memory 14, storage device 15, and one or more input and/or output (I/O) devices 16 (or peripherals) that are communicatively coupled via a local interface 18. The local interface 18 can be, for example but not limited to, one or more buses or other wired or wireless connections, as is known in the art. The local interface 18 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 12 is a hardware device for executing software, particularly that stored in the memory 14. The processor 12 can be any custom made or commercially available processor, a central processing unit (CPU), an auxiliary processor among several processors associated with the computer 10, a semiconductor based microprocessor (in the form of a microchip or chip set), a macroprocessor, or generally any device for executing software instructions.

The memory 14 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 14 may incorporate electronic, magnetic, optical, and/or other types of storage media. Note that the memory 14 can have a distributed architecture, where various components are situated remote from one another, but can be accessed by the processor 12.

The software 100 in memory 14 may include one or more separate programs, each of which contains an ordered listing of executable instructions for implementing logical functions of the sequential power application system, as described below. In the example of FIG. 1, the software 100 in the memory 14 defines the sequential power application system functionality in accordance with one embodiment of the present invention. In addition, the memory 14 may contain an operating system (O/S) 22. The operating system 22 essentially controls the execution of computer programs and provides scheduling, input-output control, file and data management, memory management, and communication control and related services.

Instructions for implementing the sequential power application system 10 may be provided by a source program, executable program (object code), script, or any other entity containing a set of instructions to be performed. When a source program, then the program needs to be translated via a compiler, assembler, interpreter, or the like, which may or may not be included within the memory 14, so as to operate properly in connection with the O/S 22. Furthermore, instructions for implementing the sequential power application system 10 can be written as (a) an object oriented programming language, which has classes of data and methods, or (b) a procedure programming language, which has routines, subroutines, and/or functions.

The I/O devices 16 may include input devices, for example but not limited to, a keyboard, mouse, scanner, microphone, etc. Furthermore, the I/O devices 16 may also include output devices, for example but not limited to, a printer, display, etc. Finally, the I/O devices 16 may further include devices that communicate via both inputs and outputs, for instance but not limited to, a modulator/demodulator (modem; for accessing another device, system, or network), a radio frequency (RF) or other transceiver, a telephonic interface, a bridge, a router, etc.

When the sequential power application system 10 is in operation, the processor 12 is configured to execute the software 100 stored within the memory 14, to communicate data to and from the memory 14, and to generally control operations of the computer 10 pursuant to the software 100. The sequential power application system 10 and the O/S 22, in whole or in part, but typically the latter, are read by the processor 12, perhaps buffered within the processor 12, and then executed.

When the sequential power application system 10 is implemented in software, as is shown in FIG. 1, it should be noted that instructions for implementing the sequential power application system 10 can be stored on any computer-readable medium for use by or in connection with any computer-related system or method. Such a computer-readable medium may, in some embodiments, correspond to either or both the memory 14 or the storage device 15 shown in FIG. 1. Instructions for implementing the sequential power application system 10 can be embodied in any computer-readable medium for use by or in connection with the processor 12 or other such instruction execution system, apparatus, or device. Although the processor 12 has been mentioned by way of example, such instruction execution system, apparatus, or device may, in some embodiments, be any computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the processor 12 or other such instruction execution system, apparatus, or device. Such a computer-readable medium may be, for example but not limited to, an electronic, magnetic, optical, electromagnetic, infrared, or semiconductor system, apparatus, device, or propagation medium, or other physical device or means that can contain or store a computer program for use by or in connection with a computer-related system or method. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the sequential power application system 10 is implemented in hardware, the sequential power application system 10 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
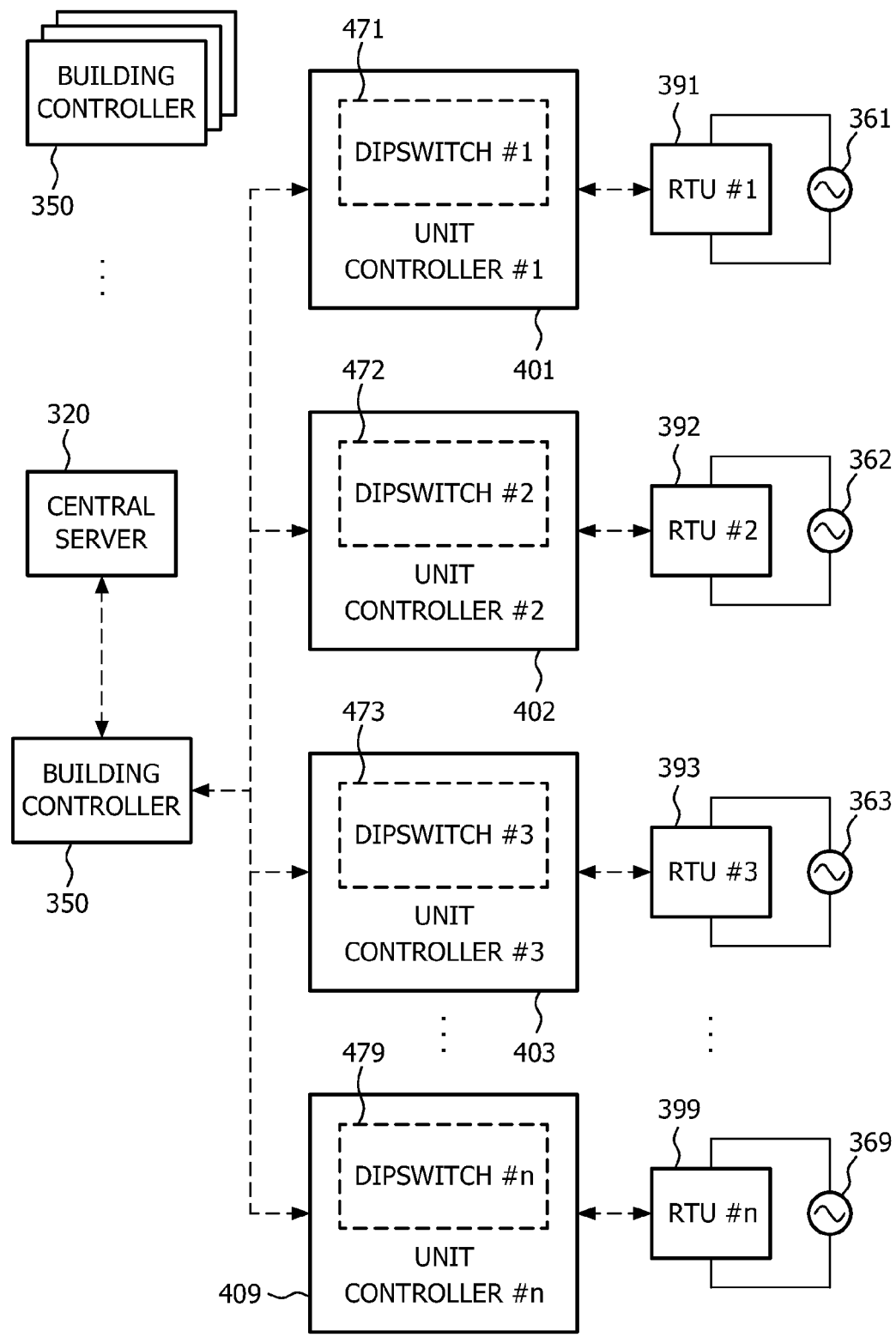
FIG. 2 is a schematic diagram showing a sequential power application system applied in the context of a building energy management system having unit controllers capable of controlling rooftop units in accordance with a first exemplary embodiment of the present invention.

FIG. 2 is a schematic diagram illustrating use of a sequential power application system 10 applied in the context of a building energy management system, in accordance with a first exemplary embodiment of the present invention.

Building energy management systems are used to control environmental conditions at buildings. Environmental conditions under the control of such a building energy management system might, for example, include climate control, lighting, and building security. In such a system, a central server 320 at a headquarters building or other such central control location might manage environmental conditions at a plurality of buildings. Each building or group of buildings might be managed by a building controller 350 that is connected to the central server 320.

As shown by FIG. 2, a plurality of building controllers 350 are shown connected to a central server 320, wherein connections to and from the building controller 350 appear below the central server 320 in FIG. 2. The building controller 350 shown below the central server 320 in FIG. 2 controls a plurality of electrical loads 391, . . . , 399 by way of a plurality of addressable unit controllers 401, . . . , 409, respectively. In FIG. 2, the sequential power application system 10 would be implemented within the unit controllers 401, . . . , 409, although it is noted that it may instead be implemented within the building controller 350 or the central server 320.

The electrical loads 391, . . . , 399 might be, for example, a plurality of heating, ventilation, and air-conditioning (hereinafter "HVAC") units in the form of rooftop units (hereinafter "RTU") 391, . . . , 399 disposed on the rooftop of the building. In the present example, alternating electric current (hereinafter "AC") is supplied to the RTUs 391, . . . , 399 from AC power sources 361, . . . , 369. Note that although AC power sources 361, . . . , 369 are shown as separate circuits in FIG. 2, as it is an object of the present invention to prevent electrical overload, it will be assumed for purposes of the present description that the respective AC power sources 361, . . . , 369 are not mutually independent but rather draw power from a common electric main supply such that applying power simultaneously to all of the RTUs 391, . . . , 399 would result in an electrical overload due to the surge currents that occur when electric power is applied to the RTUs 391, . . . , 399.

In FIG. 2, dashed lines connecting blocks indicate logic, control, or communication, while solid lines connecting blocks indicate supply of electric power. Communication lines between the central server 320 and the building controller 350, and between the building controller 350 and the unit controllers 401, . . . , 409, allow the central server 320 to control the building controller 350 and/or the unit controllers 401, . . . , 409, and allow the building controller 350 to control the unit controllers 401, . . . , 409.

It should be noted that processing for carrying out powerup-dependent control, as described with reference to the flowchart of FIG. 5, may in some embodiments be carried out completely autonomously at the unit controllers 401, . . . , 409 and/or at powerup controllers 411, . . . , 419 (FIG. 3), may in some embodiments be carried out by means of central control from the central server 320 and/or the building controller 350, and may in some embodiments be carried out partially autonomously at the unit controllers 401, . . . , 409 and/or the powerup controllers 411, . . . , 419 (FIG. 3), and partially by means of central control from the central server 320 and/or the building controller 350. That is, in at least some embodiments, there is no need for any central control system to carry out the powerup-dependent control of the flowchart of FIG. 5, as all of the information and hardware required for powerup-dependent control is in some embodiments present at the unit controller 401 and/or the powerup controller 411 (FIG. 3).

Each unit controller 401, . . . , 409 contains a dipswitch 471, . . . , 479 or other means for providing it with a unique address so as to permit it to be independently controlled by the building controller 350. During installation, the dipswitches 471, . . . , 479 of the unit controllers 401, . . . , 409 are set to respectively different settings. For example, the dipswitch 471 of the unit controller 401 for the first RTU 391 might be set to 001, the dipswitch 472 of the unit controller 402 for the second RTU 392 might be set to 002, the dipswitch 473 of the unit controller 403 for the third RTU 393 might be set to 003, and so forth. As a result, each unit controller 401, . . . , 409 will have a unique address that allows it to be independently controlled by the building controller 350 even when all of the unit controllers 401, . . . , 409 are, for example, multiplexed together on the same line.

In the present embodiment, existence of the unique addresses provided by the dipswitches 471, . . . , 479 is exploited to allow calculation of a unique time at which delivery of power to the RTU 391, . . . , 399 should be enabled so as to prevent simultaneous application of power to all RTUs 391, . . . , 399 following occurrence of a powerup event, as will described in more detail below. Although the present embodiment employs unique addresses, set at the dipswitches 471, . . . , 479, to calculate unique times at which electric power should be sequentially applied to a plurality of RTUs 391, . . . , 399, respectively, the present invention is not limited to addressable unit controllers 401, . . . , 409, but may be applied to a wide variety of situations in which a unique identifier is associated with an electrical load or the controller for an electrical load.

Figure 3:
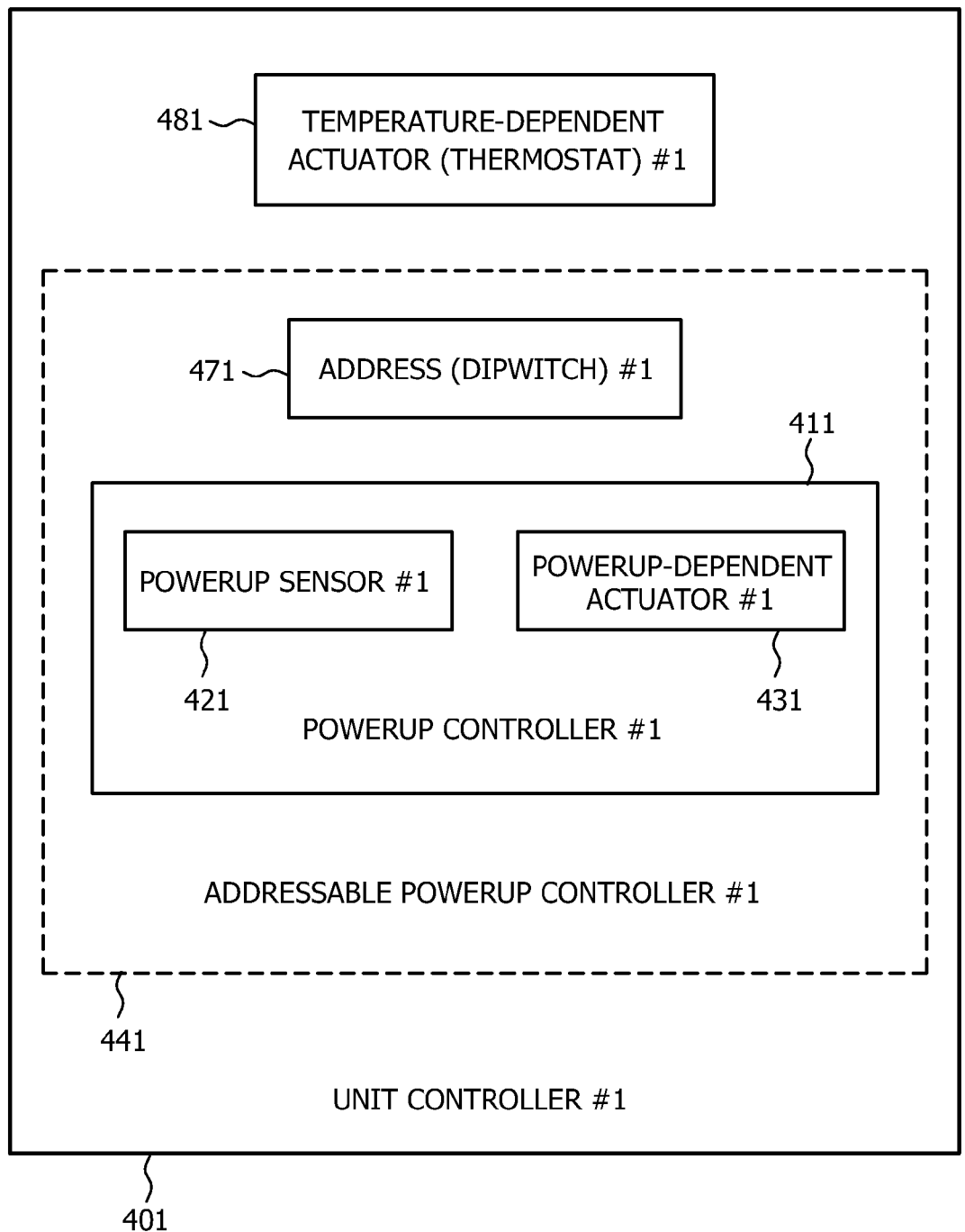
FIG. 3 is a schematic diagram showing one of the unit controllers of the building energy management system of FIG. 2.

One of the unit controllers 401, . . . , 409 from FIG. 2 is shown in FIG. 3. The description provided below of the first unit controller 401 shown in FIG. 3 may be understood to apply to any of the unit controllers 401, . . . , 409 shown in FIG. 2. In addition to the dipswitch 471 already described, the unit controller 401 shown in FIG. 3 has a temperature-dependent actuator (hereinafter "thermostat") 481 for carrying out temperature-dependent control of the RTU 391. Furthermore, the unit controller 401 of FIG. 3 has a powerup controller 411 that includes a powerup sensor 421 for sensing occurrence of a powerup event, and a powerup-dependent actuator 431 for carrying out powerup-dependent control of the RTU 391 in response to sensing of a powerup event by the powerup sensor 421.

Although the present embodiment has been described in terms of an example in which powerup-dependent control is applied to a unit controller 401 having an addressable thermostat 481 that carries out temperature-dependent control of an RTU 391, it is also possible to apply the invention to situations in which there is no thermostat 481 or other such actuator mechanism carrying out some form of regulation or control other than powerup-dependent control, in which case it will be convenient to consider the powerup controller 411 and the dipswitch 471 (or other such addressable identifier) when taken together to constitute an addressable powerup controller 441, as indicated by the dashed line in FIG. 3.

The thermostat 481 of FIG. 3 may be modeled as a temperature-dependent relay or other such switch that regulates delivery of electric power to the RTU 391 or other such electrical load, and the powerup-dependent actuator 431 may be modeled as a powerup-dependent relay or other such switch in series with the thermostat 481. Similarly, in another embodiment, timers in the form of time-dependent relays may be employed in place of thermostats 481, . . . , 489 for time-dependent control of lighting units that are employed in place of RTUs 391, . . . , 399, in which case powerup-dependent actuators 431, . . . , 439 may be modeled as powerup-dependent relays or other such switches placed in series with the timers. Where the present invention is thus applied to unit controllers 401, . . . , 409 already equipped with relay-like ability to regulate delivery of power to electrical loads in correspondence to temperature, time, or some other condition, this may facilitate implementation of the invention thereto, as it may be possible to carry out powerup-dependent control from a central location such as a central server 320 or a building controller 350, and it may further be possible in such situations to carry out powerup-dependent control in software or by techniques that, for example, mimic a condition that will force the existing relay-like actuator to deliver or not deliver power to the electrical load as required for powerup-dependent control.

For example, control of the RTUs 391, . . . , 399 by the unit controllers 401, . . . , 409, which is indicated by the dashed line of FIG. 2, may include temperature-dependent control carried out by the thermostats 481, . . . , 489 (482-489, not shown) and powerup-dependent control carried out by the powerup-dependent actuators 431, . . . , 439 (432-439, not shown). In some embodiments, the thermostats 481, . . . , 489 and/or the powerup-dependent actuators 431, . . . , 439 may be capable of being controlled by the central server 320 and/or the building controllers 350. For example, in some embodiments, the central server 320 and/or the building controllers 350 may be capable of altering various parameters affecting operation of the thermostats 481, . . . , 489 and/or the powerup-dependent actuators 431, . . . , 439. For example, in some embodiments, the central server 320 and/or the building controllers 350 may be capable of altering temperature setpoints of the thermostats 481, . . . , 489 or delay times of the powerup-dependent actuators 431, . . . , 439, or might be capable of forcing the thermostats 481, . . . , 489 and/or the powerup-dependent actuators 431, . . . , 439 to actuate so as to deliver or not deliver power to the RTUs 391, . . . , 399.

The present invention is not limited in application to systems already equipped with relay-like ability to regulate delivery of power to electrical loads in correspondence to temperature, time, or some other condition. It is also possible to employ a powerup controller 441 that may be modeled as a powerup-dependent relay or other such switch in series with the circuit that supplies power to the electrical load without the need for this to be in series with any other actuator or other such device having relay-like ability to regulate delivery of power to electrical loads in correspondence to temperature, time, or some other condition. For example, taking the example of the system shown in FIG. 2, but in which the RTUs 391, . . . , 399 are not controlled by thermostats 481, . . . , 489 for temperature-dependent regulation of power to the RTUs 391, . . . , 399, as there would in such case be no need for the thermostat 481 shown in FIG. 3, the unit controller 401 might in such case simply consist of an addressable powerup controller 441. That is, in such case, the powerup-dependent actuator 431 of such an addressable powerup controller 441 might be modeled as the contacts of a relay that are inserted in series with the circuit that supplies power to the RTU 391 or other such electrical load in the same manner that the contacts of a thermostat would be inserted in series with the circuit that supplies power to the RTU 391 had a thermostat been employed.

Thus, at FIG. 3, the thermostat 481 can take the form of a temperature-actuated relay. Furthermore, the powerup-dependent actuator 431 can take the form of another relay, the actuation of which is dependent upon sensing of a powerup event by the powerup sensor 421. In some embodiments, provision of a separate relay for use as the powerup-dependent actuator 431 can be omitted if the thermostat 481 is made to mimic operation of such a powerup control relay by, for example, forcing the setpoint of the thermostat 481 to an infinitely high or low temperature depending on whether the RTU 391 is employed for heating or cooling and depending on whether it is desired that the RTU 391 be enabled or disabled. Moreover, one of ordinary skill in the art will recognize that temperature-dependent control and/or powerup-dependent control may be accomplished by means other than relay(s). However, for purposes of the present description it will be assumed for convenience that relays are respectively employed as the powerup-dependent actuator 431 and the thermostat 481. One of ordinary skill in the art will be able to readily apply the following description to embodiments in which temperature-dependent control and/or powerup-dependent control is accomplished by means other than relay(s), and to embodiments in which the same control means is employed for both temperature-dependent control and powerup-dependent control.

As used herein, "actuation" of a relay includes energizing and deenergizing the relay. Specifically, a relay can be set up to allow power to be supplied to an RTU 391, . . . , 399 when energized, and to disrupt supply of power thereto when deenergized. Alternatively, a relay can be set up to allow power to be supplied to an RTU 391, . . . , 399 when deenergized, and to disrupt supply of power thereto when energized. As can be seen by FIG. 3, each of the unit controllers 401, . . . , 409 in the example shown has a thermostat 481, . . . , 489. Specifically, each RTU 391, . . . , 399 is controlled by its own thermostat 481, . . . , 489.

Furthermore, the powerup sensor 421 of the powerup controller 411 located in the unit controllers 401 shown in FIG. 3 has the ability to sense when electric power is and is not being supplied from the AC power source 361 to the RTU 391. Specifically, during normal operation, a thermostat 481, . . . , 489 may regulate delivery of electric power to an RTU 391, . . . , 399 by means of the contacts of a temperature-actuated relay or similar mechanism acting as a switch that is inserted in series with the circuit supplying electric power from an AC power source 361, . . . , 369 to the RTU 391, . . . , 399. At this time, in the language of the present document, electric power is said to be supplied to an RTU 391, . . . , 399, or electric power is said to be available to the RTU 391, . . . , 399, or delivery of electric power to the RTU 391, . . . , 399 is said to be enabled, even when the contacts of the relay at the corresponding thermostat 481, . . . , 489 are open and electric power is not actually being delivered from the AC power source 361, . . . , 369 to the RTU 391, . . . , 399.

Before electric power is initially supplied from the AC power sources 361, . . . , 369, or during a power outage when electric power is no longer being supplied from the AC power sources 361, . . . , 369, the thermostats 481, . . . , 489 in some embodiments may continue to actuate in correspondence to temperature if the thermostats 481, . . . , 489 do not depend on receipt of electric power from the AC power sources 361, . . . , 369 in order to be able to operate. Alternatively, if the thermostats 481, . . . , 489 depend on receipt of electric power from the AC power sources 361, . . . , 369 in order to be able to operate, the thermostats 481, . . . , 489 may revert to their deenergized state when electric power is not being supplied from the AC power sources 361, . . . , 369. In either case, the powerup sensors 421, . . . , 429 of the powerup controllers 411, . . . , 419 have the ability to sense when electric power is and is not being supplied from the AC power sources 361, . . . , 369 to the RTUs 391, . . . , 399.

Where the thermostats 481, . . . , 489 do not depend on receipt of electric power from the AC power sources 361, . . . , 369 in order to be able to operate, sensing by a powerup sensor 421, . . . , 429 of whether electric power is available from an AC power source 361, . . . , 369 may be carried out by detecting the voltage at the circuit supplying electric power from that AC power source 361, . . . , 369 to the corresponding RTU 391, . . . , 399. Where the thermostats 481, . . . , 489 depend on receipt of electric power from the AC power sources 361, . . . , 369 in order to be able to operate, sensing by the powerup sensor 421, . . . , 429 of whether electric power is available from the AC power source 361, . . . , 369 may be carried out by sensing the voltage at the circuit supplying electric power from the AC power source 361, . . . , 369 to the corresponding RTU 391, . . . , 399. Alternatively, since unavailability of electric power from the AC power source 361, . . . , 369 to the RTU 391, . . . , 399 will in such case also result in unavailability of electric power from the AC power source 361, . . . , 369 to the thermostat 481, . . . , 489, this fact can be exploited by using any of various suitable means to detect the state transition that occurs in going from a power-off condition to a power-on condition.

Figure 4:
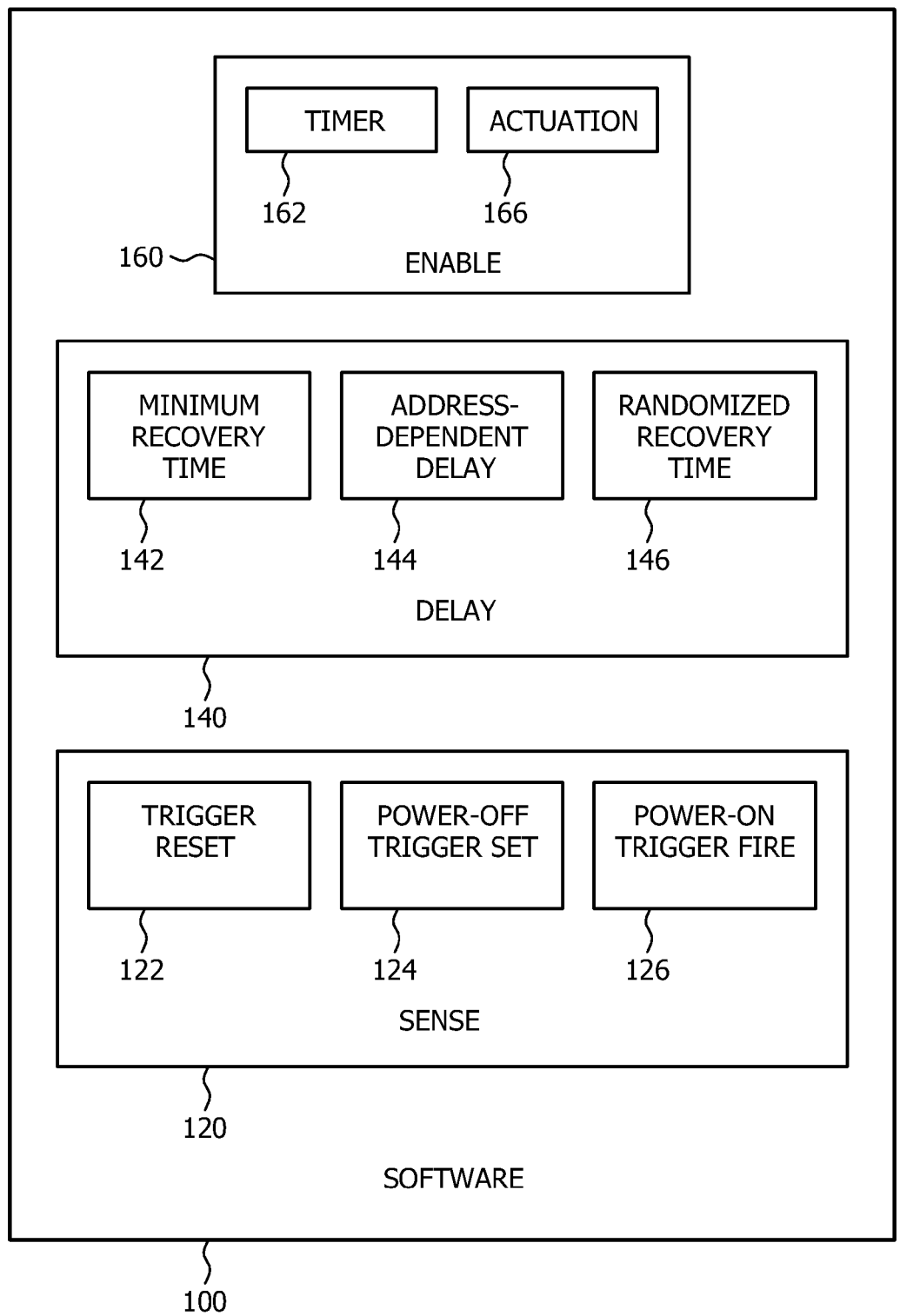
FIG. 4 is a schematic diagram showing functional blocks representing functionality defined by the software of FIG. 1 when applied to the building energy management system of FIG. 2 and the unit controller of FIG. 3.

FIG. 4 is a schematic diagram illustrating functional blocks representing functionality defined by the software 100 of FIG. 1 when applied to the first exemplary embodiment of the invention. In accordance with the present embodiment, the software 100 includes a sense module 120, a delay module 140, and an enable module 160.

The sense module 120 includes functionality for sensing a powerup event. Specifically, the sense module 120 includes functionality for sensing a state transition occurring when a state in which electric power is not available to an electrical load (power-off condition) is followed by a state in which electric power is available to the electrical load (power-on condition). For example, in one embodiment, the sense module 120 may detect existence of a powerup event when a powerup sensor 421 detects that electric power previously unavailable from an AC power source 361 is now available from the AC power source 361.

In one embodiment, the sense module 120 includes a trigger reset block 122, a power-off trigger set block 124, and a power-on trigger fire block 126. Absence of electric power at the powerup sensor 421 in such an embodiment may cause the power-off trigger set block 124 to set a flag or otherwise alter a state of some component so as to record existence of the power-off condition after the fashion of cocking a trigger. Furthermore, the power-on trigger fire block 126 may, after the fashion of firing a cocked trigger, determine that a powerup event has occurred when presence of electric power at the powerup sensor 421 is detected at a time when the flag or other such state record as set by the power-off trigger set block 124 indicates that a power-off condition had previously occurred. Following sequential or delayed delivery of power to the electrical load as described below, the trigger reset block 122 may reset the flag or other such state record to indicate nonoccurrence of a power-off condition so as to permit the sense module 120 to sense a subsequent powerup event.

The delay module 140 includes functionality for calculating an appropriate delay to wait following occurrence of a powerup event before power should be applied to an electrical load. To avoid electrical overload due to simultaneous application of electrical power to multiple electrical loads, following sensing of a powerup event by the sense module 120, embodiments of the present invention calculate appropriate delays to wait at each of a plurality of electrical loads so as to permit power to be applied to the electrical loads in sequential or nonsimultaneous fashion. It should be noted that, as it is not the delay per se but the use of delays of respectively different lengths at respectively different electrical loads that permits nonsimultaneous application of power to multiple electrical loads in such embodiments, a delay of zero at the first electrical load among the multiple electrical loads to which power is sequentially applied is possible. Moreover, in embodiments in which there are addressable unit controllers 401, . . . , 409 present at the RTUs 391, . . . , 399, or other such electrical loads, this powerup-dependent control by which power is sequentially or nonsimultaneously applied to multiple electrical loads may be carried out at the respective unit controllers 401, . . . , 409 based on the respective addresses of those unit controllers 401, . . . , 409 without the need for powerup-dependent control to be carried out by a central controller such as a central server 320 or building controller 350.

The delay module 140 includes a minimum recovery time block 142, an address-dependent delay block 144, and a randomized recovery time block 146. The minimum recovery time block 142 may have functionality for determining a minimum recovery time to be allowed between delays calculated by the delay modules 140 at respective unit controllers 401, . . . , 409. Specifically, as the purpose of applying power to multiple electrical loads in sequential or nonsimultaneous fashion is to allow the AC power sources 361, . . . , 369 or other such electric power source(s) to recover from the electrical surge that occurs when power is applied to one electrical load before applying power to the next electrical load, this minimum recovery time preferably represents the time that it takes such power source(s) to recover from that electrical surge. There is no particular objection to employment of measuring equipment in some embodiments to measure electrical characteristics of the power source(s) and/or load(s) to determine the minimum recovery time employed at the minimum recovery time block 142. However, in one embodiment, the minimum recovery time at the minimum recovery time block 142 may be simply set to a predetermined value in advance based on known or anticipated characteristics of the power source(s) and/or load(s).

The address-dependent delay calculation block 144, where present, may have functionality for calculating an appropriate delay based on an address of a unit controller. For example, in the embodiment described with reference to FIGS. 2 and 3, in which dipswitches 471, . . . , 479, set to 001, . . . , 009 at unit controllers 401, . . . , 409, serve as the addresses of the unit controllers 401, . . . , 409, the address-dependent delay calculation block 144 may calculate an address-dependent delay as the address multiplied by the minimum recovery time as determined by the minimum recovery time block 142. Alternatively, since, as mentioned above, there is no particular objection to employment of a delay time of zero at the first electrical load to which power is applied, the address-dependent delay calculation block 144 may calculate the address-dependent delay time by using the address minus one in place of the address, with this then being multiplied by the minimum recovery time. For example, if the minimum recovery time as determined at the minimum recovery time block 142 is 5 seconds and the dipswitches 471, . . . , 479 of the unit controllers 401, . . . , 409 are set to 001, . . . , 009, the address-dependent delay block 144 at the respective unit controllers 401, . . . , 409 may calculate respective delay times of 0 sec, 5 sec, 10 sec, . . . , 40 seconds in correspondence to the values set at the respective dipswitches 471, . . . , 479.

The addresses set at the dipswitches 471, . . . , 479 in the embodiment described with reference to FIGS. 2 and 3 are consecutive integers beginning with 1 (or 0). In an embodiment in which the addresses of the unit controllers 401, . . . , 409 are not consecutive integers beginning with 1 (or 0), those addresses are preferably first normalized or otherwise converted so as to be integers, preferably consecutive integers, and still more preferably consecutive integers beginning with 1 (or 0).

The randomized recovery time block 146 may have functionality for calculating a random or pseudorandom time interval that may supplement or serve in place of the minimum recovery time in some embodiments. For example, the randomized recovery time block 146 in one embodiment may employ a random number generator to calculate a random or pseudorandom time interval (hereinafter "randomized recovery time"). For example, the randomized recovery time may be calculated by the randomized recovery time block 146 so as to be, on average, of the same or similar magnitude as the minimum recovery time described with reference to the minimum recovery time block 142. As another example, this randomized recovery time might be calculated so as to statistically ensure that the difference between successive delays at a known number of unit controllers 401, . . . , 409 will be at least as large as the minimum recovery time an acceptable amount of the time. In accordance with the present invention, an "acceptable amount of the time" may in one embodiment be understood to mean most of the time. In another embodiment, this "acceptable amount of the time" might be measured in terms of standard deviations. For example, in one embodiment in which the address-dependent delay calculation block 144 uses a randomized recovery time calculated by the randomized recovery time block 146 in place of a minimum recovery time calculated by the minimum recovery time block 142 to calculate a delay to wait before applying power to an electrical load, this delay being equal to the address (or the address minus one) times the randomized recovery time, the randomized recovery time generated by the randomized recovery time block 146 may be statistically designed so as to ensure that, on average, the delay calculated by the address-dependent delay calculation block 144, when a randomized recovery time is employed in place of the minimum recovery time, is within, for example, two standard deviations of the delay that would be calculated by the address-dependent delay calculation block 144 were the minimum recovery time employed.

In one embodiment, a delay may be calculated by the address-dependent delay calculation block 144 as described above, except that a hybrid of the minimum recovery time and the randomized recovery time, referred to herein as a randomized minimum recovery time, may be employed in place of the minimum recovery time or the randomized recovery time. Specifically, such a randomized minimum recovery time may have a minimum recovery time component and a randomized recovery time component. For example, if the minimum recovery time component is defined to be half of the minimum recovery time as calculated by the minimum recovery time block 142 as described above, and the randomized recovery time component is defined to be half of the randomized recovery time as calculated by the randomized recovery time block 146 as described above, the randomized minimum recovery time in one embodiment may be defined as the sum of the minimum recovery time component and the randomized recovery time component. In this example, the sum is used in place of the minimum recovery time or the randomized recovery time by the address-dependent delay calculation block 144 to calculate a delay to wait before applying power to an electrical load.

The enable module 160 may include functionality for enabling delivery of power to an electrical load. In one embodiment, the enable module 160 includes a timer block 162 and an actuation block 166. Herein, the timer block 162 may have functionality for measuring an elapsed time interval, this elapsed time interval being the delay as calculated by the delay module 140. The actuation block 166 may have functionality for closing electrical contacts or otherwise enabling delivery of power to the electrical load.

Figure 5:
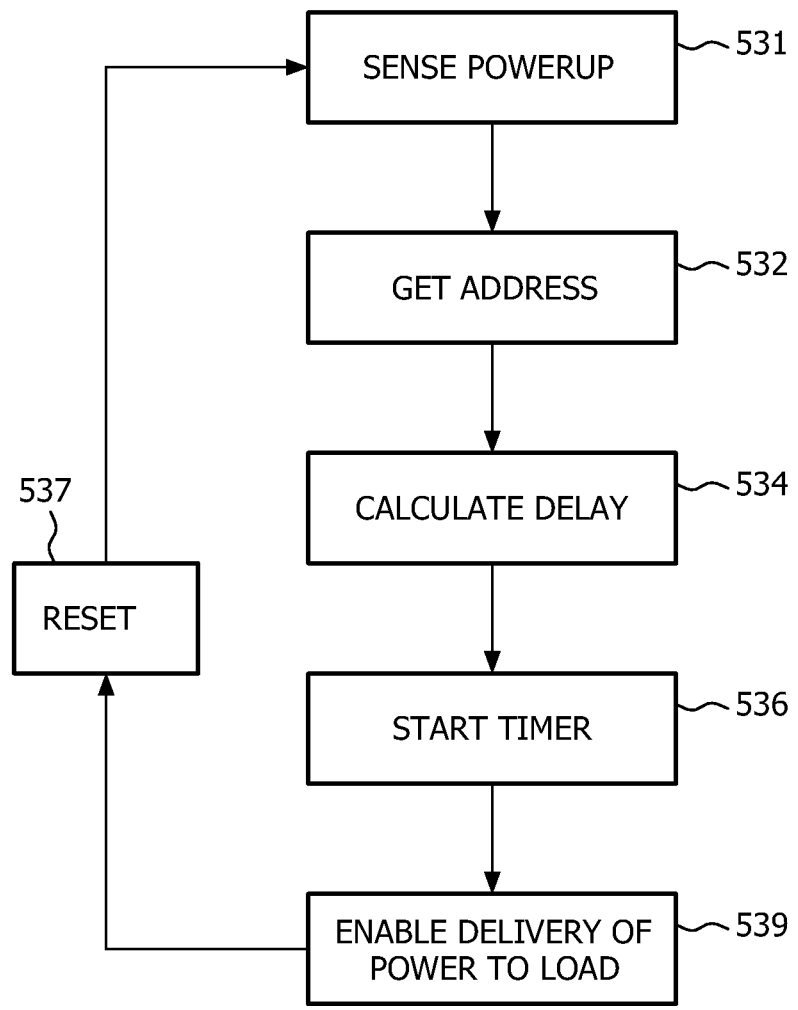
FIG. 5 is a flowchart showing an example of processing carried out when a powerup event occurs in the context of the building energy management system shown in FIG. 2 under control of the software described with reference to FIG. 4.

FIG. 5 is a flowchart 500 illustrating an example of processing carried out when a powerup event occurs in the context of the building energy management system shown in FIG. 2 under control of software 100 described with reference to FIG. 4. For purposes of the present description, it should be understood that the functionality of the software 100 shown in FIG. 4 may, for example, be implemented by an addressable powerup controller 441 as shown at FIG. 3. Although described below with reference to the first unit controller 401 that controls the first RTU 391, the following description should be understood to apply to the first through nth unit controllers 401, . . . , 409 that respectively control the first through nth RTUs 391, . . . , 399. It should also be noted that, in accordance with an alternative embodiment of the invention, a single unit controller may instead control more than one RTU.

As shown by block 531, the sense module 120 uses the powerup sensor 421 to detect occurrence of a powerup event. Specifically, a powerup event is determined to have occurred when a power-off condition as determined by the power-off trigger set block 124 is followed by a power-on condition as determined by the power-on trigger fire block 126.

As shown by block 532, the address set at the dipswitch 471 of the unit controller 401 is read. The address read at block 532 is used by the delay module 140 to calculate an appropriate delay to wait before enabling delivery of electric power to the RTU 391 (block 534). In calculating this delay, the address-dependent delay block 144 may use a minimum recovery time as determined at the minimum recovery time block 142 and/or a randomized recovery time as determined at the randomized recovery time block 146 to determine an appropriate delay in correspondence to the address set at the dipswitch 471.

As shown by block 536, the timer block 162 of the enable module 160 counts down the time represented by the delay calculated by the delay module 140 at block 534. After the timer block 162 determines that the delay calculated by the delay module 140 has elapsed, the actuation block 166 of the enable module 160 closes switch contacts or otherwise enables delivery of electric power to the RTU 391 (block 539).

As shown by block 537, after delivery of electric power to the RTU 391 has been enabled, the trigger reset block 122 causes the trigger employed by the power-off trigger set block 124 and the power-on trigger fire block 126 to be reset so as to permit a subsequent powerup event to be sensed by the sense module 120.

As described above, to prevent electrical overload or other such adverse effect, embodiments of the present invention may employ addressable switches to carry out sequential application of electric power to a plurality of electrical loads following a powerup event such as might occur when electric power is restored after a power outage. Such sequential application of electric power may, for example, be accomplished by calculating unique delays to wait before application of electric power to the electrical loads controlled by the addressable switches. These delays are preferably calculated based on the unique addresses of the addressable switch so as to permit powerup control to be carried out at the addressable switches without the need for central control.

Thus, as described above, one embodiment of the present invention permits sequential powering up of all building equipment and utilities so as to not have everything that uses power within a building come on at the exact same time. For example, where, as in the example shown at FIG. 2, there are in a building a plurality of rooftop, heat pump, HVAC or other such high-electrical-load units 391, . . . , 399, and each such unit 391, . . . , 399 is controlled by a communicating thermostat or other such unit controller 401, . . . , 409, the communicating unit controllers 401, . . . , 409 may all be communicatively coupled to the same building controller 350. In order for the building controller 350 to access each of the communicating unit controllers 401, . . . , 409, each communicating unit controller 401, . . . , 409 may, for example, be assigned a unique network address 471, . . . , 479. These unique addresses or identifiers 471, . . . , 479 may, for example, start at 1 with the first communicating unit controller 401 and increase monotonically for each additional communicating unit controller 402, . . . , 409 present in the building. This being the case, when power is first applied, or when power dropouts of sufficient duration cause the equipment to shut down and restart, each communicating unit controller 401, . . . , 409 may delay activation of the HVAC or other such high-electrical-load unit 391, . . . , 399 controlled by the communicating unit controller 401, . . . , 409 by an amount of time that is a function of the network address 471, . . . , 479 assigned to the communicating unit controller 401, . . . , 409. Since each communicating unit controller 401, . . . , 409 addressed by a given building controller 350 will in such case have a uniquely numbered address 471, . . . , 479, it is possible to activate each HVAC or other such high-electrical-load unit 391, . . . , 399 in sequential rather than simultaneous fashion, in accordance with the method described above.

Embodiments of the present invention may be implemented in any of a wide variety of forms. To list a few examples, representative embodiments of the present invention might take any of the following forms: a powerup sensor; a powerup-dependent actuator; a powerup controller having a powerup sensor and a powerup-dependent actuator; an addressable powerup controller; an addressable unit controller having a powerup controller; an addressable unit controller having a powerup controller and a thermostat; an addressable thermostat capable of being made to act as a powerup controller; a controller-equipped RTU or other such HVAC or other high-load unit; a powerup-controlled RTU or other such high-load unit; a temperature-controlled/powerup-controlled HVAC or other such unit; a time-controlled/powerup-controlled lighting apparatus or other such unit; a system including a plurality of powerup-controlled units; a building energy management system including at least one building controller and a plurality of powerup-controlled units; or a system having one or more central servers and at least one building controller that controls a plurality of unit controllers respectively controlling a plurality of units associated therewith.

Although a powerup controller has been shown as being present within a unit controller, the present invention is not limited thereto, there being no particular objection to embodiments in which any of the various functionalities of the present invention are disposed elsewhere.

Herein, description of the software 100 with reference to FIG. 4 has been provided in the context of a building energy management system. The system shown at FIG. 2 contains a powerup controller 411 schematically depicted as being within a unit controller 401 as shown in FIG. 3 for control of an RTU 391 in the context of a building energy management system. From the description provided herein, it should be understood that the various functionalities of the software 100 described with reference to FIG. 4, and the processing described with reference to FIG. 5, may be carried out by the powerup controller 411 shown in FIG. 3. Although it may be convenient to carry out the various functionalities of the software 100 described with reference to FIG. 4, and/or the processing described with reference to FIG. 5, at the powerup controllers 411, . . . , 419 and/or the unit controllers 401, . . . , 409 shown in FIGS. 2 and 3, except where otherwise clear from context, note that there is no particular objection to carrying out all or any part of the functionalities of the software 100 described with reference to FIG. 4, and/or all or any part of the processing described with reference to FIG. 5, at the building controller 350 and/or the central server 320, for example. One having ordinary skill in the art will readily understand how to apply the description provided herein to operation of the software 100 in the context of embodiments in which the present invention is implemented in other forms or at other locations.

Although HVAC rooftop units controlled by unit controllers having thermostats were employed as an example of electrical loads controlled by addressable controllers that may be subjected to powerup-dependent control in accordance with one embodiment of the present invention, in accordance with other embodiments of the present invention any suitable electrical load may be subjected to powerup-dependent control. There is no particular need for the electrical loads to be related to temperature or climate control, and there is no particular need for the unit controllers to be equipped with thermostats. Other examples of suitable electrical loads controlled by addressable controllers that might be subjected to powerup-dependent control in accordance with embodiments of the present invention include lighting and security systems, just to name a couple of examples.

Although the example has been given of HVAC RTUs serving as electrical loads and although AC power sources have been mentioned as examples of electric power, there is of course no objection to use of electrical loads other than HVAC units, whether rooftop or otherwise, and there is of course no objection to use of DC power or DC loads.

Although the example has been given of an HVAC RTU controlled by a thermostat, the present invention is not limited thereto, it being possible to employ any type of addressable controller capable of enabling and disabling delivery of electric power to any type of unit representing an electrical load. Note that where such a unit is not already equipped with an addressable controller capable of enabling and disabling delivery of electric power thereto, a powerup controller as described above may be installed thereat so as to equip the unit with such an addressable controller capable of enabling and disabling delivery of electric power thereto.

Although examples have been provided in which the present invention is applied to unit controllers that are equipped with actuators or other mechanisms for regulation or control other than powerup-dependent control, such as a thermostat for temperature-dependent control of a rooftop HVAC unit, or a timer for time-dependent control of a lighting unit, the present invention is not limited thereto, it being possible to apply the invention to situations in which no such regulation or control other than powerup-dependent control is carried out. Specifically, even where electrical loads would not otherwise be subjected to any sort of regulation or control, by equipping a plurality of electrical loads with powerup controllers having respectively unique addresses or identifiers as described above it will be possible to implement powerup-dependent control such as will permit electric power to be sequentially applied to the respective loads following a powerup event.

Although examples have been provided in which thermostats and other actuators, including powerup-dependent actuators, are modeled as relays, such actuators, where present, need not be limited to devices that would fall within a narrow definition of the term "relay." For example, any device acting as a switch capable of being actuated in correspondence to a suitable condition or event may be sufficient in some embodiments.

In embodiments in which the present invention is applied to a unit controller that is equipped, for example, with a temperature-dependent actuator (thermostat) for temperature-dependent control, although there is no particular objection to employment of dedicated relays or other such switches for each of the thermostat and the powerup-dependent actuator, it is also possible in some embodiments to employ a single relay or other such switch as both thermostat and powerup-dependent actuator. For example, by changing the setpoint of a thermostat to an infinitely high or low temperature depending on whether an RTU, for example, is employed for heating or cooling and depending on whether it is desired that the RTU be enabled or disabled, it is possible to force the thermostat to stay off, disabling delivery of power to the RTU during the powerup delay so as to carry out powerup-dependent control of the RTU without the need for a separate relay or other such switch for the powerup-dependent actuator.

Furthermore, although the example has been given of forcing a thermostat or other such temperature-dependent control means to mimic operation of powerup-dependent control means in the context of a unit controller equipped with a thermostat for temperature-dependent control of HVAC RTUs, similar strategies may be employed with unit controllers employed in other contexts. For example, in the context of a unit controller equipped with a timer for time-dependent control of lighting, the timer may be made to mimic operation of powerup-dependent control means by changing the setpoint of the timer so as to effectively trick the timer into thinking that is time for the lights to be turned off during the powerup delay.

Although the present invention has been described as being applied to sequential application of power to electrical loads respectively associated with addressable thermostats or other such addressable controllers, where embodiments of the present invention calculate a unique delay in correspondence to a unique identifier, this delay being the time to wait before applying electric power to the load following a powerup event, note that the network address of such addressable thermostat or controller has been given merely as one example of such a unique identifier. The present invention is not limited to addressable controllers or network addresses, it being possible to employ any suitable unique identifier associated with the electrical load (or associated with a controller or other device that is itself associated with the electrical load) for calculation of the delay.

Although examples have been given in which various operations associated with sensing, delay, and enabling as carried out by the software described with reference to FIG. 4 have been described in terms that may be suggestive of implementation through digital processing, the present invention is not limited thereto, as such steps may alternatively or in addition be implemented by analog or other non-digital-processing means. For example, time constants from various electric, electronic, electromechanical, mechanical, optical, or acoustic components may be employed for the delay at the delay module 140.

Although the word "calculation" has been used in connection with delays of respectively different length employed at respectively different electrical loads to allow power to be applied thereto in sequential or nonsimultaneous fashion following sensing of a powerup event, this should not be interpreted to limit the scope of the invention to embodiments employing arithmetic operations and/or digital signals. It is also possible in some embodiments to implement the steps carried out by the delay module through use of analog, mechanical, or other non-arithmetic or non-digital-processing means.

Although it was stated that the power-off trigger set block of the sense module in one embodiment may set a flag or otherwise alter a state of some component so as to record existence of a power-off condition, note that recording as used in this context need not necessarily refer to recording of electrical signals or data in memory or other such storage device but may also include analog, mechanical, or other non-digital-processing means of recording that a power-off condition has occurred. For example, in an embodiment in which power outage at an electrical load being controlled by a controller having a relay also results in power outage at the controller, deenergizing of the relay as a result of the power outage might serve as a record of the power-off condition, it being possible to use relay contacts opened or closed as a result of the deenergizing of the relay as the setting of the trigger by the power-off trigger set block that may be carried out in such an embodiment.

As described above, sequential power application sensors, identifiers, actuators, controllers, units, systems, and methods in accordance with various aspects and embodiments of the present invention solve one or more of the problems mentioned above, and may also provide other advantages and benefits.

It should be emphasized that the above-described embodiments of the present invention are merely possible examples of implementations, merely set forth for a clear understanding of the principles of the invention.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. An energy management system for providing sequential power application to more than one electrical load, the system comprising:
   a series of electrical loads configured to receive power from a power source;
   a plurality of unit controllers, wherein each unit controller is connected to a respective electrical load and controls power application to the electrical load, each individual unit controller being provided with a unique identification to allow for communication with the individual unit controller, wherein each unit controller is configured to calculate a unique power-on delay associated with the unique identification of the respective connected unit controller, wherein the each unique power-on delay is calculated as the unique identification of the specific unit controller multiplied by a minimum recovery time, the minimum recovery time comprising an amount of time required for the power source to recover from powerup of an electrical load, and wherein each of the plurality of unit controllers further comprises:
   a memory; and
   a processor configured by the memory to perform the steps of: (i) determining if a power-off condition has occurred, being followed by a power-on condition, the sequence of these conditions being referred to as a powerup event; and (ii) enabling delivery of power, after a powerup event, to the respective electrical load at a time corresponding to and in accordance with the calculated unique power-on delay of the unit controller applying power to the respective electrical load;
   wherein the plurality of unit controllers are configured to deliver power after a powerup event in a non-overlapping sequential sequence to the series of electrical loads.

2. The energy management system of claim 1, wherein the unique identification of each unit controller is provided by an associated dipswitch located on each unit controller.

3. The energy management system of claim 1, wherein all of the electrical loads are located within the same building.

4. The energy management system of claim 1, wherein the electrical loads are not all located within the same building.

5. The energy management system of claim 1, wherein the electrical loads are selected from the group consisting of heating units, ventilation units, and air conditioning units.

6. The energy management system of claim 1, wherein the unit controller is connected to more than one electrical load and is capable of controlling power application to the more than one electrical load.

7. The energy management system of claim 1, wherein the energy management system further comprises an array of unit controllers, wherein each unit controller controls power application to one or more electrical loads.

8. An energy management system for providing sequential power application to more than one electrical load, comprising:
   a series of electrical loads configured to receive power from a power source;
   a series of unit controllers, wherein each unit controller is connected to at least one electrical load and wherein each individual unit controller is provided with a unique identification to allow for communication with the individual unit controller;
   a building controller for controlling power application to at least one electrical load within the series of electrical loads, via communication with at least one unit controller associated with the at least one electrical load, wherein the building controller is configured to calculate a unique power-on delay associated with the unique identification of each of the at least one unit controllers, wherein the unique power-on delay is calculated as the unique identification of the at least one unit controller multiplied by a minimum recovery time, the minimum recovery time comprising an amount of time required for the power source to recover from powerup of an electrical load, and wherein the building controller further comprises:

a memory; and a processor configured by the memory to perform the steps of: (i) determining if a power-off condition has occurred, being followed by a power-on condition, the sequence of these conditions being referred to as a powerup event; and (ii) enabling delivery of power, after a powerup event, to the at least one electrical load at a time corresponding to and in accordance with the calculated unique power-on delay of the unit controller applying power to the at least one electrical load;

wherein the building controller is configured to deliver power after a powerup event in a non-overlapping sequential sequence to the series of electrical loads.

9. The energy management system of claim 8, wherein the unique identification of each unit controller is provided by an associated dipswitch located on each unit controller.

10. The energy management system of claim 8, wherein all of the electrical loads are located within the same building and are selected from the group consisting of heating units, ventilation units, and air conditioning units.

11. The energy management system of claim 8, wherein the electrical loads are not all located within the same building.

* * * * *